United States Patent
Houlihan et al.

[15] 3,671,534
[45] June 20, 1972

[54] 6,6-DI-LOWER ALKYL-2,3,5,6-TETRAHYDROIMIDAZO [2,1-B] THIAZOLES

[72] Inventors: William J. Houlihan; Robert E. Manning, both of Mountain Lakes, N.J.

[73] Assignee: Sandoz-Wander, Inc., Hanover, N.J.

[22] Filed: March 16, 1970

[21] Appl. No.: 20,071

[52] U.S. Cl..................260/306.7, 260/309.6, 260/340.5, 424/270, 260/592
[51] Int. Cl. .........................................C07d 99/06
[58] Field of Search.............................260/306.7

[56] References Cited
UNITED STATES PATENTS

3,551,426  12/1970  Manning..............................260/306.7
3,560,515  2/1971  Elslager et al. ......................260/306.7

*Primary Examiner*—Alex Mazel
*Assistant Examiner*—R. J. Gallagher
*Attorney*—Gerald D. Sharkin, Frederick H. Weinfeldt, Robert S. Honor, Walter F. Jewell and Richard E. Vila

[57] ABSTRACT

Substituted imidazo thiazoles, e.g., 3-(4'-chlorophenyl)-6,6-dimethyl-2-ethyl-3-hydroxy-2,3,5,6-tetrahydroimidazo[2,1-b] thiazole are prepared from 2-haloalkylphenones and 4,4-di-lower alkyl-2-imidazolinethione and are useful as diuretics.

2 Claims, No Drawings

6,6-DI-LOWER ALKYL-2,3,5,6-TETRAHYDROIMIDAZO [2,1-B] THIAZOLES

This invention relates to novel heterocyclic compounds. More specifically it relates to novel 2-alkyl-3-substituted phenyl-6,6-di-lower alkyl-imidazo thiazoles, acid addition salts thereof, and processes for their preparation.

The thiazoles of the present invention may be represented by the formula

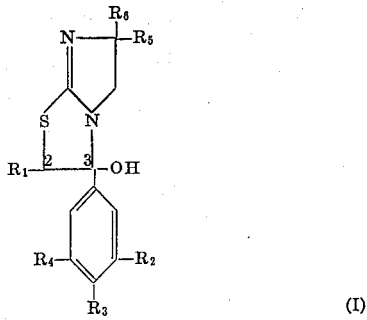

(I)

where $R_1$ represents straight chain lower alkyl, i.e., straight chain alkyl having one to four carbon atoms such as methyl, ethyl and propyl; $R_2$, $R_3$ and $R_4$ each, independently, represents H or halogen having an atomic weight of about 19 to 36, straight chain lower alkyl as defined above, lower alkoxy, i.e., a straight chain lower alkoxy having one to four carbon atoms, e.g., methoxy, ethoxy, propoxy, etc., trifluoromethyl, or any two of $R_2$, $R_3$ and $R_4$ on adjacent carbon atoms together represent methylenedioxy; and $R_5$ and $R_6$ each, independently, represents straight chain lower alkyl as defined above, provided at least one of $R_2$, $R_3$ and $R_4$ is other than H, and $R_3$ is hydrogen when either of $R_2$ or $R_4$ or both is trifluoromethyl; or a pharmaceutically acceptable acid addition salt thereof.

Preferred aspects of this invention are those wherein $R_1$ represents ethyl, $R_3$ represents chloro and $R_2$ and $R_4$ both represent hydrogen.

Compounds of formula (I) may be prepared in acid addition salt form (Ia) in accordance with the following reaction scheme:

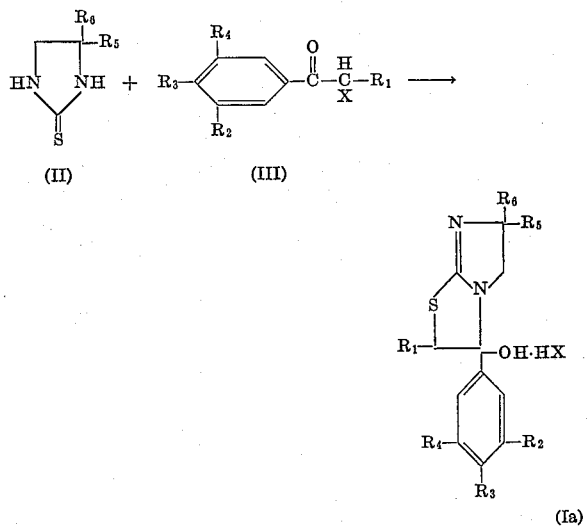

where $R_1$, $R_2$, $R_3$, $R_4$, $R_5$ and $R_6$ and the proviso as set set out above and X is halo having an atomic weight of between about 35 to 80.

The compounds of formula (Ia) are prepared by treating 2-haloalkyl phenones with 4,4-di-lower alkyl-2-imidazolinethiones at a temperature below 50° C. in a solvent which is inert under the reaction conditions. Although the particular solvent is not critical, the preferred solvents are acetone or the lower alkanols, i.e., lower alkanols having one to five carbon atoms, e.g. methanol, ethanol, and the like. The process is preferably carried out at a temperature between about 20°–50° C., especially between about 20° to 30° C. For optimum results, the reaction is normally carried out over a period of 3 to 48 hours. The product Ia is recovered by conventional techniques, e.g., by precipitation.

Compounds of formula (III) are prepared in accordance with the following reaction scheme:

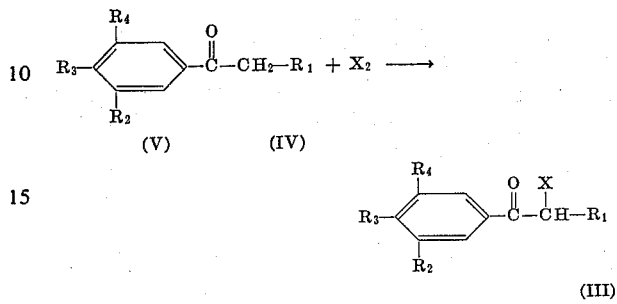

where X, $R_1$, $R_2$, $R_3$, $R_4$ and the proviso are as set out above.

The compounds of formula (III) are prepared by treating alkyl phenyl ketones (V) with said halogen (IV) at a temperature below 50° C. in a solvent which is inert under the reaction conditions. The preferred solvents are chloroform, carbon tetrachloride or methylene dichloride. The process is preferably carried out at a temperature between about 0°–50° C. and more preferably at a temperature between about 20°–35 C. For optimum results, the reaction is allowed to run for about 1 to 8 hours. The compound of formula (III) is recovered by conventional means, e.g., evaporation.

When the compounds of formula (I) above are recovered in salt form and it is desired to convert the salts to the corresponding free bases, conventional techniques may be utilized, e.g., dissolution of the salt in water and precipitation using a base such as sodium carbonate.

The compounds of formula (I) may also be illustrated by their tautomeric equivalents such as represented by the following structural formula

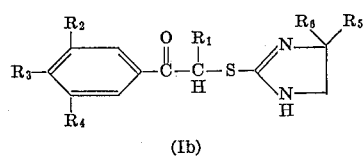

(Ib)

where $R_1$, $R_2$, $R_3$, $R_4$, $R_5$ and $R_6$ have the above stated significance, and it will be appreciated that the tautomers can exist in equilibrium. In order to simplify this description, however, formula (I) only will be used, although both tautomeric forms are considered to be within the concept of the present invention.

Certain of the compounds of formulas (II) and (V) are known and are prepared by methods disclosed in the literature. The compounds of formulas (II) and (IV) not specifically disclosed are prepared from known materials using analogous methods.

The compounds of formula (I) are useful because they possess pharmacological activity in animals. More particularly, the compounds are useful as diuretics as indicated by their activity in unanesthetized male Wistar rats tested using basically the method described by R. Asten (Toxicol. and Appl. Pharmacol., 1:277, 1959) and in unanesthetized dogs using basically the method described by Barrett et al. (Toxicol. and Appl. Pharmacol., 1:333–349, 1959).

For such uses, the compounds (I) may be combined with a pharmaceutically acceptable carrier or adjuvant, and may be administered orally in such forms as tablets, capsules, elixirs, suspensions and the like, or parenterally in the form of an injectable solution or suspension. The dosage will vary depending upon the mode of administration utilized and the particular compound employed. The compounds may be similarly administered in the form of their non-toxic pharmaceutically acceptable acid addition salts, e.g., hydrobromide, fumarate, maleate, citrate and the like. Such salts possess the same order of activity as the free base, are readily prepared by reacting the base with an appropriate acid and accordingly are included within the scope of the invention.

In general, satisfactory results for the diuretic use are obtained when the compounds are administered at a daily dosage of from about 2 to 100 milligrams per kilogram of animal body weight. This daily dosage is preferably given 2 to 4 times a day or in sustained release form. For most large animals, the total daily dosage is from about 150 to 1,500 milligrams, and dosage forms suitable for internal administration comprise from about 32.5 to 750 milligrams of compound (I) in admixture with a solid or liquid pharmaceutical carrier or diluent.

A representative formulation suitable for oral administration is a capsule prepared by standard techniques which contains the following:

| Ingredient | Parts by Weight |
|---|---|
| 3-(4'-chlorophenyl)-6,6-dimethyl-2-ethyl-3-hydroxy-2,3,5,6-tetrahydroimidazo[2,1-b]-thiazole | 100 |
| Inert filler (lactose, kaolin, starch, etc.) | 200 |

EXAMPLE 1

3-(4'-chlorophenyl)-6,6-dimethyl-2-ethyl-3-hydroxy-2,3,5,6-tetrahydroimidazo-[2,1-b]thiazole hydrobromide

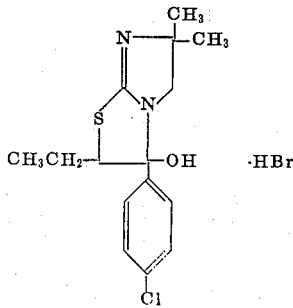

A flask equipped with a stirrer and dropping funnel is charged with 13.5 g (0.07 mole) of 4'-chlorobutyrophenone and 250 ml of chloroform. The solution is stirred and a solution of 12.0 g (4.0 ml, 0.07 mole) of bromine in 75 ml of chloroform is added dropwise at a rate such that the internal flask temperature does not exceed 35° C. The resulting solution is stirred for 1 hour and the solvent removed in vacuo. The residue is dissolved in 50 ml of acetone and added in one portion to a slurry of 9.1 g (0.07 mole) of 4,4-dimethyl-2-imidazolinethione and 135 ml of acetone. The reaction is exothermic and a solution results. In about 1 hour a solid comes out of solution. Stirring is continued for 24 hours at room temperature at which time the resultant solid is filtered off to give 3-(4'-chlorophenyl)-6,6-dimethyl-2-ethyl-3-hydroxy-2,3,5,6-tetrahydroimidazo[2,1e-b]thiazole hydrobromide; mp 171°–175° C.

When 4'-methylbutyrophenone, 4'-methoxybutyrophenone, 4'-trifluoromethylbutyrophenone or 3',4'-methylenedioxybutyrophenone is used in place of 4'-chlorobutyrophenone in the process of this example, there is obtained 6,6-dimethyl-2-ethyl-3-hydroxy-3-(4'-methylphenyl)-2,3,5,6-tetrahydroimidazo[2,1-b]thiazole hydrobromide, 6,6-dimethyl-2-ethyl-3-hydroxy-3-(4'-methoxy-phenyl)-2,3,5,6-tetrahydroimidazo[2,1-b]thiazole hydrobromide, 6,6-dimethyl-2-ethyl-3-hydroxy-3-(4'-trifluoromethylphenyl)-2,3,5,6-tetrahydroimidazo[2,1-b]thiazole hydrobromide; or 6,6-dimethyl-2-ethyl-3-hydroxy-3-(3',4'-methylenedioxyphenyl)-2,3,5,6-tetrahydroimidazo[2,1-b]thiazole hydrobromide, respectively.

What is claimed is:

1. A compound of the formula

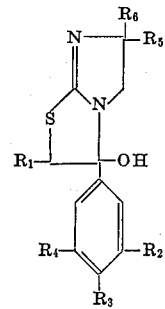

where $R_1$ is lower alkyl; $R_2$, $R_3$ and $R_4$ each, independently, represents hydrogen, fluoro, chloro, lower alkyl, lower alkoxy, trifluoromethyl, or any two of $R_2$, $R_3$ or $R_4$ on adjacent carbon atom together represent methylenedioxy; and $R_5$ and $R_6$ each, independently, represent lower alkyl, provided at least one of $R_2$, $R_3$ and $R_4$ is other than hydrogen, and $R_3$ is hydrogen when $R_2$ or $R_4$ or both is trifluoromethyl; or a pharmacologically acceptable acid addition salt thereof.

2. The compound of claim 1 which is 3-(4'-chlorophenyl)-6,6-di-methyl-2-ethyl-3-hydroxy-2,3,5,6-tetrahydroimidazo[2,1e-b]thiazole.

* * * * *